(12) United States Patent
Ashitaka et al.

(10) Patent No.: US 11,001,501 B2
(45) Date of Patent: *May 11, 2021

(54) METHOD FOR PRODUCING SILICA SOL

(71) Applicant: FUJIMI INCORPORATED, Kiyosu (JP)

(72) Inventors: Keiji Ashitaka, Kiyosu (JP); Masaaki Ito, Kiyosu (JP); Jun Shinoda, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,137

(22) Filed: Feb. 12, 2020

(65) Prior Publication Data

US 2020/0180968 A1   Jun. 11, 2020

Related U.S. Application Data

(63) Continuation of application No. 15/748,771, filed as application No. PCT/JP2016/071780 on Jul. 25, 2016, now Pat. No. 10,604,411.

(30) Foreign Application Priority Data

Jul. 31, 2015 (JP) ................. 2015-152705

(51) Int. Cl.
*C01B 33/145* (2006.01)
*C08L 83/04* (2006.01)
*B01J 13/00* (2006.01)

(52) U.S. Cl.
CPC ......... *C01B 33/145* (2013.01); *B01J 13/0026* (2013.01); *C08L 83/04* (2013.01)

(58) Field of Classification Search
CPC ....... C01B 33/145; B01J 3/0026; C08L 83/04
(Continued)

(56) References Cited

U.S. PATENT DOCUMENTS 4,842,837 A   6/1989 Shimizu et al.
10,604,411 B2 *   3/2020 Ashitaka ............... C01B 33/145
(Continued)

FOREIGN PATENT DOCUMENTS

JP   S61-158810 A   7/1986
JP   S63-074911 A   4/1988
(Continued)

OTHER PUBLICATIONS

Office Action issued in corresponding Chinese Application No. 201680045088.6 dated Jul. 30, 2020 with English translation.
(Continued)

*Primary Examiner* — William K Cheung
(74) *Attorney, Agent, or Firm* — Foley & Lardner LLP

(57) ABSTRACT

[Problem] Provided is a method for producing a silica sol capable of providing consistent production of the silica sol having a uniform particle size of silica particles in any particle size of the silica particles.
[Solution] A method for producing a silica sol is a method including a step of mixing liquid (A) containing an alkaline catalyst, water, and a first organic solvent with liquid (B) containing an alkoxysilane or its condensate and a second organic solvent, and liquid (C1) having a pH of 5.0 or higher and lower than 8.0 and containing water or liquid (C2) containing water and being free of an alkaline catalyst to make a reaction liquid.

6 Claims, 1 Drawing Sheet

(58) Field of Classification Search
USPC .......................................................... 516/81
See application file for complete search history.

(56) References Cited

U.S. PATENT DOCUMENTS

| | | | |
|---|---|---|---|
| 2007/0237701 A1 | 10/2007 | Yamakawa et al. | |
| 2008/0290521 A1 | 11/2008 | Hamada et al. | |
| 2010/0283133 A1* | 11/2010 | Hamada | C08G 77/08 257/632 |
| 2013/0045282 A1 | 2/2013 | Zielecka et al. | |

FOREIGN PATENT DOCUMENTS

| JP | H02-293314 A | 12/1990 |
|---|---|---|
| JP | H02293314 A | 12/1990 |
| JP | H03-275527 A | 12/1991 |
| JP | H06-287013 A | 10/1994 |
| JP | H06287013 A | 10/1994 |
| JP | H07-206451 A | 8/1995 |
| JP | H11-060232 A | 3/1999 |
| JP | 2005-060217 A | 3/2005 |
| JP | 2005-060219 A | 3/2005 |
| JP | 2008-247731 A | 10/2008 |
| JP | 2008247731 A | 10/2008 |
| TW | 200604097 A | 2/2006 |
| WO | WO-2011/139170 A1 | 10/2011 |

OTHER PUBLICATIONS

Office Action issued on Japanese Application No. 2017-532509, dated Nov. 12, 2019.
Office Action received in corresponding Taiwanese Patent Application No. 105124163 dated Sep. 27, 2019.
Notice of Allowance on U.S. Appl. No. 15/748,771 dated Nov. 22, 2019.
Supplemental Notice of Allowability on U.S. Appl. No. 15/748,771 dated Jan. 21, 2020.
Office Action issued in corresponding Chinese Patent Application No. 202102602800500 dated Jan. 29, 2021 with English translation.

* cited by examiner

[FIG. 1]
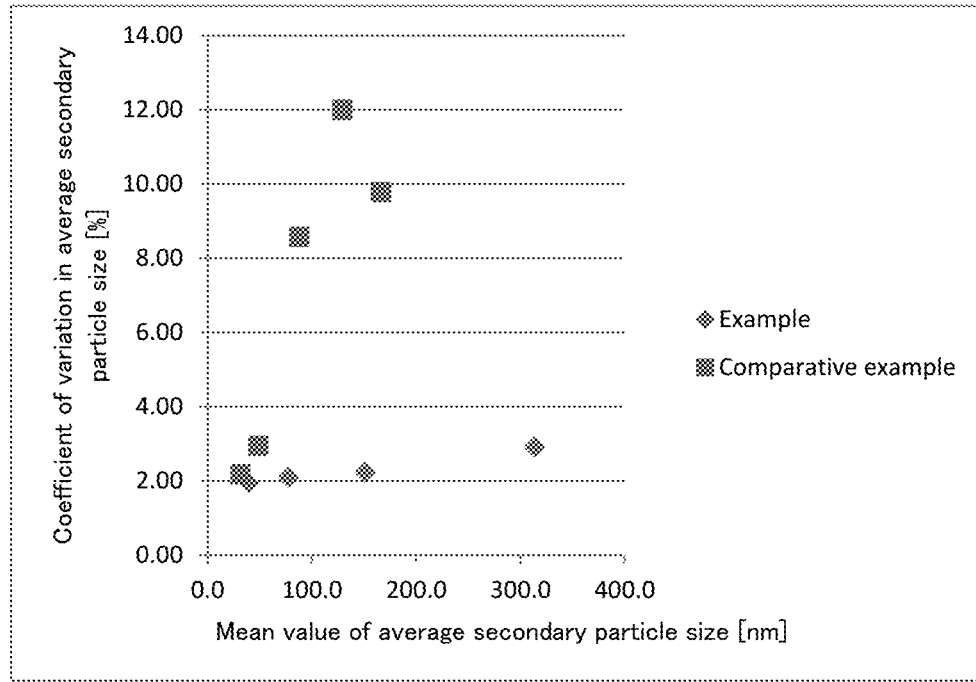
[FIG. 2]
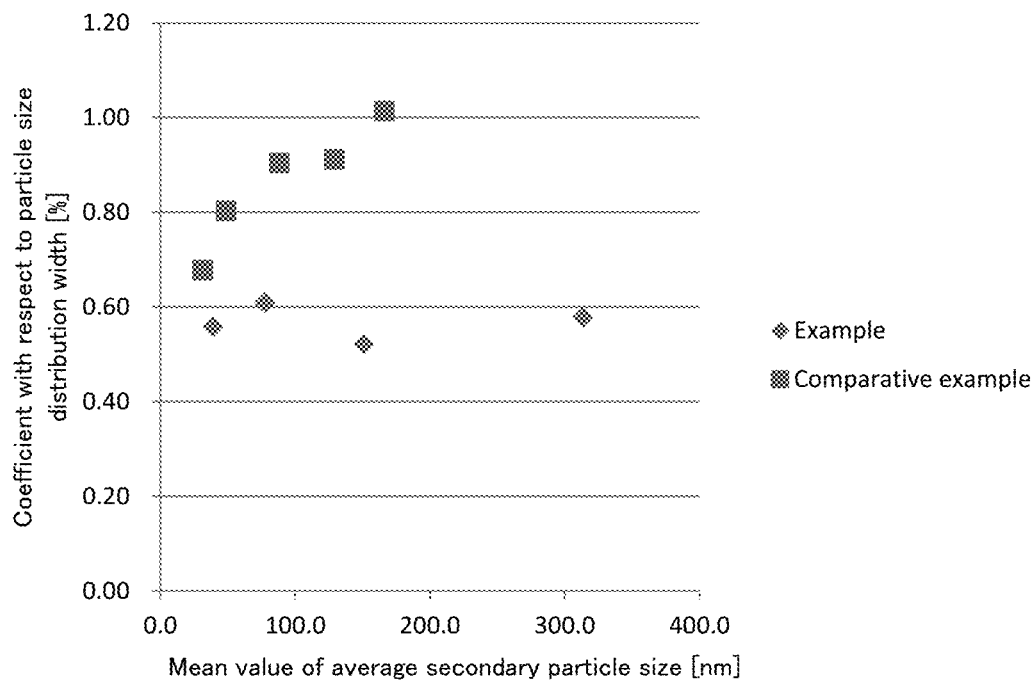

METHOD FOR PRODUCING SILICA SOL

CROSS-REFERENCE TO RELATED APPLICATIONS

The present application is a continuation of U.S. patent application Ser. No. 15/748,771, filed on Jan. 30, 2018, which is a 371 of PCT/JP2016/071780, filed Jul. 25, 2016, which is based upon and claims the benefit of priority from Japanese Patent Application No. 2015-152705, filed Jul. 31, 2015. The entire contents of all of the above applications are incorporated herein by reference.

TECHNICAL FIELD

The present invention relates to a method for producing a silica sol.

BACKGROUND ART

Conventionally, a production method using a sodium silicate solution, which is referred to as water glass, as a starting material is known as a method for producing a silica sol (Patent Literature 1). In the production method, the sodium silicate solution is treated once with a cation exchange resin to remove ions such as sodium ion. Thus, purity as a starting material is increased, and then the resultant is used for producing a silica sol.

However, in a production method of Patent Literature 1, high purification of a starting material by ion exchange has limitations.

Then, as a method for obtaining a high purity silica sol, methods including using hydrolysis of a high purity alkoxysilane such as ethyl orthosilicate are disclosed (Patent Literatures 2 to 4).

Patent Literatures 2 to 4 disclose a 2 liquid reaction type method for producing a silica sol including addition of a liquid containing an alkoxysilane and an organic solvent to a liquid containing an alkaline catalyst, water, and an organic solvent. The 2 liquid reaction type method for producing a silica sol cannot increase a concentration of each material in a reaction solution, and thus it is hard to produce a silica sol at a high concentration, which leads to problems in productivity.

With respect to the above-mentioned problems, Patent Literature 5 discloses a 3 liquid reaction type method for producing a silica sol including addition of an organic solvent containing tetramethoxysilane and a solvent containing an alkaline catalyst and water to an organic solvent containing an alkaline catalyst and water. According to such a method, it may be possible to highly concentrate silica particles in a reaction solution.

CITATION LIST

Patent Literature

Patent Literature 1: JP S61-158810 A
Patent Literature 2: JP S63-74911 A (corresponding to U.S. Pat. No. 4,842,837)
Patent Literature 3: JP 2005-60219 A
Patent Literature 4: JP H11-60232 A
Patent Literature 5: JP 2005-60217 A

SUMMARY OF INVENTION

The present inventors found, however, that the method for producing a silica sol described in Patent Literature 5 has a problem, when producing a silica sol, that the method sometimes leads to wide variation in a particle size of silica particles, and thus the method cannot provide consistent production of a silica sol having a uniform particle size of silica particles.

Accordingly, an object of the present invention is to provide a method for producing a silica sol capable of stably producing the silica sol having a uniform particle size of silica particles in any particle size of the silica particles.

The present inventors have carried out a diligent study to solve the problems mentioned above. As a result, in order to achieve the object mentioned above, a method for producing a silica sol reflecting one aspect of the present invention includes the following embodiments. A first embodiment of the present invention is a method for producing a silica sol including a step of mixing liquid (A) containing an alkaline catalyst, water, and a first organic solvent with liquid (B) containing an alkoxysilane or its condensate and a second organic solvent, and liquid (C1) having a pH of 5.0 or higher and lower than 8.0 and containing water to make a reaction liquid. Further, a second embodiment of the present invention is a method for producing a silica sol including a step of mixing liquid (A) containing an alkaline catalyst, water, and a first organic solvent with liquid (B) containing an alkoxysilane or its condensate and a second organic solvent, and liquid (C2) containing water and being free of an alkaline catalyst to make a reaction liquid.

BRIEF DESCRIPTION OF DRAWINGS

FIG. 1 is a graph showing relationships, with respect to silica particles in silica sols produced in Examples and Comparative Examples, between a coefficient of variation in average secondary particle sizes and a mean value of average secondary particle sizes in each of lots.

FIG. 2 is a graph showing relationships, with respect to silica particles in silica sols produced in Examples and Comparative Examples, between a mean value of coefficients with respect to width of particle size distributions and a mean value of average secondary particle sizes in each of lots.

DESCRIPTION OF EMBODIMENTS

A first embodiment of the present invention is a method for producing a silica sol including a step of mixing liquid (A) containing an alkaline catalyst, water, and a first organic solvent with liquid (B) containing an alkoxysilane or its condensate and a second organic solvent, and liquid (C1) having a pH of 5.0 or higher and lower than 8.0 and containing water to make a reaction liquid.

A second embodiment of the present invention is a method for producing a silica sol including a step of mixing liquid (A) containing an alkaline catalyst, water, and a first organic solvent with liquid (B) containing an alkoxysilane or its condensate and a second organic solvent, and liquid (C2) containing water and being free of an alkaline catalyst to make a reaction liquid.

According to configurations of the above-described first embodiment or second embodiment, a method for producing a silica sol of the present invention can consistently produce a silica sol having a uniform particle size of silica particles in any particle size of the silica particles. Further, a production method of the present invention can highly concentrate silica particles in a silica sol, and thus can provide excellent productivity of a silica sol.

Although detailed reasons why a conventional method fails to produce consistently a silica sol having a uniform particle size of silica particles, and why a method for producing a silica sol of the present invention can consistently produce a silica sol having a uniform particle size of silica particles are not known, a presumed mechanism is as follows.

That is, in a method for producing a silica sol of the present invention, when tetramethoxysilane is, for example, used as an alkoxysilane, which is a raw material, a chemical reaction producing a silica sol can be represented by the following reaction formula (1).

Reaction Formula (1)

[Chemical formula 1]

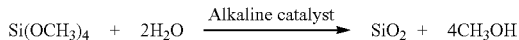

Rate determining factors of the reaction in producing a silica sol are tetramethoxysilane ($Si(OCH_3)_4$) as a starting material, water ($H_2O$) for hydrolysis, and an alkaline catalyst as a catalyst.

As production methods for a silica sol, 2 liquid reaction type and 3 liquid reaction type are known as described above. The 2 liquid reaction type methods as described in Patent Literatures 2 to 4 include, for example, addition of a liquid (for addition side) containing tetramethoxysilane and an organic solvent to a liquid (for reception side) containing an alkaline catalyst, water, and an organic solvent. In the 2 liquid reaction type method, a reception side liquid, which contains an alkaline catalyst, water and an organic solvent, must contain all amount of water, which is one of the rate determining factor of the reaction, and thus it is presumed that highly concentrating silica particles is difficult. On the other hand, the 3 liquid reaction type method as described in Patent Literature 5 includes addition of a liquid (for addition side) containing tetramethoxysilane and an organic solvent and a liquid (for addition side) containing an alkaline catalyst and water to a liquid (for reception side) containing an alkaline catalyst, water and an organic solvent. Since an alkaline catalyst is added to the reception side containing an alkaline catalyst, local concentration of the alkaline catalyst is made higher. In a portion with high concentration of the alkaline catalyst, growth of a silica particle is accelerated locally. Accordingly, the present inventors thought that the above-mentioned mechanism would often lead to wide variation in a particle size of silica particles.

A first embodiment and a second embodiment of the present invention are multi-liquid reactions. Further, a first embodiment and a second embodiment are reactions using 3 or more liquids, and the first embodiment includes mixing of liquid (A) containing an alkaline catalyst, water, and a first organic solvent with liquid (B) containing an alkoxysilane or its condensate and a second organic solvent, and liquid (C1) having a pH of 5.0 or higher and lower than 8.0 and containing water to make a reaction liquid, and the second embodiment includes mixing of liquid (A) containing an alkaline catalyst, water, and a first organic solvent with liquid (B) containing an alkoxysilane or its condensate and a second organic solvent, and liquid (C2) containing water and being free of an alkaline catalyst to make a reaction liquid. The present inventors produced a silica sol using, in order not to elevate concentration of an alkaline catalyst locally, liquid (C1) having a pH of 5.0 or higher and lower than 8.0 and containing the greatest amount, in molar ratio, of "water for hydrolysis" among the 3 constituents, which are rate determining factors of the reaction. Further, in order not to elevate concentration of an alkaline catalyst locally, the present inventors produced a silica sol using liquid (C2) containing water and being free of an alkaline catalyst on the addition side. Then, the present inventors found surprisingly that a multi-liquid reaction using 3 or more liquids can be consistently regulated, and a silica sol having a uniform particle size of silica particles can be consistently produced, leading to the completion of the present invention.

However, the above-described mechanisms mere presumptions, and, needless to say, do not limit the technical scope of the present invention.

An embodiment of the present invention is described below. The present invention is not limited only to the following embodiments. Further, in the present specification, the expression "X to Y" showing a range represents "X or more and Y or less". In addition, manipulation and measurement of physical properties or the like are carried out under the conditions of at room temperature (25° C.) and relative humidity of 40 to 50% RH unless specifically noted.

A first embodiment of a method for producing a silica sol of the present invention includes a step of mixing liquid (A) containing an alkaline catalyst, water, and a first organic solvent (also referred to as "(A) liquid" in the present specification) with liquid (B) containing an alkoxysilane or its condensate and a second organic solvent (also referred to as "(B) liquid" in the present specification), and liquid (C1) having a pH of 5.0 or higher and lower than 8.0 and containing water (also referred to as "(C1) liquid" in the present specification) to make a reaction liquid. Further, a second embodiment includes a step of mixing liquid (A) containing an alkaline catalyst, water, and a first organic solvent with liquid (B) containing an alkoxysilane or its condensate and a second organic solvent, and liquid (C2) containing water and being free of an alkaline catalyst (also referred to as "(C2) liquid" in the present specification) to make a reaction liquid. In the reaction liquid made in the first or the second embodiment, an alkoxysilane or its condensate is hydrolyzed and polycondensed to produce a silica sol.

In the present invention, from the viewpoint of purity (high purification) of the obtained silica sol, it is especially preferred that the silica sol is produced by a sol-gel process. The sol-gel process refers to a process of using a solution of an organometallic compound as a starting material, hydrolyzing and polycondensing a compound in a solution to make the solution into a sol in which fine particles of an oxide or a hydroxide of a metal are dissolved, and further carrying out a reaction to obtain an amorphous gel formed by gelation. In the present invention, a silica sol can be obtained by hydrolyzing an alkoxysilane or its condensate in an organic solvent containing water.

However, a production method of the present invention is not only applied to production of a silica sol, but also can be applied to a synthesis of a metal oxide except for a synthesis of a silica sol by a sol-gel process.

<<Method for Producing Silica Sol>>

A first embodiment of a method for producing a silica sol of the present invention includes a step of mixing liquid (A) containing an alkaline catalyst, water, and a first organic solvent with liquid (B) containing an alkoxysilane or its condensate and a second organic solvent, and liquid (C1) having a pH of 5.0 or higher and lower than 8.0 and containing water to make a reaction liquid. Further, a second embodiment includes a step of mixing liquid (A) containing an alkaline catalyst, water, and a first organic solvent with liquid (B) containing an alkoxysilane or its condensate and a second organic solvent, and liquid (C2) containing water and being free of an alkaline catalyst to make a reaction liquid. In the reaction liquid made in the first or the second embodiment, an alkoxysilane or its condensate is hydrolyzed and polycondensed to produce a silica sol. Description of constituent features of a method for producing a silica sol regarding a first embodiment and a second embodiment of the present invention is provided below.

[Liquid (A) Containing an Alkaline Catalyst, Water, and a First Organic Solvent]

(A) liquid is common in a first and a second embodiments of the present invention, and the following description is also common to them.

Liquid (A) containing an alkaline catalyst, water, and a first organic solvent of the present invention can be prepared by mixing an alkaline catalyst, water, and a first organic solvent. In addition to the alkaline catalyst, water, and the organic solvent, (A) liquid can contain other constituents so long as they do not impair the effect of the present invention.

As an alkaline catalyst contained in (A) liquid, conventionally known alkaline catalysts can be used. From the viewpoint that contamination of a metallic impurity or the like can be reduced as much as possible, the alkaline catalyst is preferably at least one of ammonia, tetramethylammonium hydroxide, and other ammonium salts, or the like. Among the above-described alkaline catalysts, from the viewpoint of an excellent catalytic action, ammonia is more preferred. Since ammonia is highly volatile, it can be easily removed from the above-described silica sol. The alkaline catalyst can be used solely, or two or more of the alkaline catalysts can be used in combination.

As water contained in (A) liquid, from the viewpoint of reducing contamination of a metallic impurity or the like, pure water or ultrapure water is preferably used.

As a first organic solvent contained in (A) liquid, a hydrophilic organic solvent is preferably used. Specifically, the first organic solvent includes alcohols such as methanol, ethanol, n-propanol, isopropanol, ethylene glycol, propylene glycol, 1,4-butanediol; and ketones such as acetone and methyl ethyl ketone, or the like.

Especially in the present invention, as the above-described first organic solvent, alcohols are preferred. By using alcohols, when water substitution (described below) of the above-described silica sol is carried out, alcohols can be easily substituted with water by heat distillation. Further, from the viewpoint of recovery and reuse of organic solvents, it is preferable to use alcohols of the same types as an alcohol produced by hydrolysis of an alkoxysilane.

Among alcohols, at least one of methanol, ethanol, and isopropanol, or the like is more preferred. When tetramethoxysilane is used as an alkoxysilane, a first organic solvent is preferably methanol.

The above-described first organic solvent can be used solely, or two or more of the first organic solvents can be used in combination.

Contents of an alkaline catalyst, water, and a first organic catalyst in (A) liquid are not specifically limited, and an alkaline catalyst, water, and a first organic solvent used can be changed according to a desired particle size, and contents of an alkaline catalyst, water, or a first organic solvent can be suitably adjusted according to the alkaline catalyst, water, or the first organic solvent used. In a production method of the present invention, by regulating a content of an alkaline catalyst in (A) liquid, a particle size of a silica particle can be regulated. For example, when ammonia is used as an alkaline catalyst, a lower limit of a content of ammonia is, from the viewpoint of an effect as a hydrolysis catalyst or growth of a silica particle, preferably 0.1% by mass or more, and more preferably 0.3% by mass or more with respect to the whole amount of (A) liquid (100% by mass). Further, an upper limit of a content of ammonia is not specifically limited, and from the viewpoint of productivity and cost, the upper limit is preferably 50% by mass or less, more preferably 40% by mass or less, further more preferably 20% by mass or less. A lower limit of a content of water is adjusted according to an amount of an alkoxysilane or its condensate used for reaction, and the lower limit is, from the viewpoint of hydrolysis of an alkoxysilane, preferably 5% by mass or more, and more preferably 10% by mass or more with respect to the whole amount of (A) liquid (100% by mass). Further, an upper limit of a content of water is, from the viewpoint of compatibility with (B) liquid, preferably 50% by mass or less, and more preferably 40% by mass or less with respect to the whole amount of (A) liquid (100% by mass). When methanol is used as a first organic solvent, a lower limit of a content of methanol is, from the viewpoint of compatibility with (B) liquid, preferably 10% by mass or more, and more preferably 20% by mass or more with respect to the whole amount of (A) liquid (100% by mass). Further, an upper limit of a content of a first organic solvent is, from the viewpoint of dispersibility, preferably 98% by mass or less, and more preferably 95% by mass or less with respect to the whole amount of (A) liquid (100% by mass).

[Liquid (B) Containing an Alkoxysilane or its Condensate and a Second Organic Solvent]

(B) liquid is common in a first and a second embodiments of the present invention, and the following description is also common to them.

Liquid (B) containing an alkoxysilane or its condensate and a second organic solvent of the present invention can be prepared by mixing an alkoxysilane or its condensate with a second organic solvent. Since excessively high concentration of an alkoxysilane or its condensate tends to result in severe reaction, which readily leads to production of gel-like material, and from the viewpoint of miscibility, liquid (B) is preferably prepared by dissolving an alkoxysilane or its condensate in an organic solvent.

In addition to an alkoxysilane or its condensate and a second organic solvent, (B) liquid can contain other constituents so long as they do not impair the effect of the present invention.

An alkoxysilane or its condensate contained in (B) liquid includes tetramethoxysilane, tetraethoxysilane, tetrapropoxysilane, or their condensate. The alkoxysilane or its condensate can be used solely, or two or more alkoxysilanes or their condensates can be used in combination. Among the alkoxysilanes or their condensates, from the viewpoint of having a suitable hydrolytic reactivity, tetramethoxysilane is preferred.

As a second organic solvent contained in (B) liquid, a hydrophilic organic solvent is preferably used. Specifically, the second organic solvent includes alcohols such as methanol, ethanol, n-propanol, isopropanol, ethylene glycol, propylene glycol, 1,4-butanediol, or the like; and ketones such as acetone, methyl ethyl ketone, or the like.

Especially in the present invention, as the above-described second organic solvent, alcohols are preferred. By using alcohols, when water substitution (described below) of the above-described silica sol is carried out, alcohols can be easily substituted with water by heat distillation. Further, from the viewpoint of recovery and reuse of organic solvents, it is preferable to use alcohols of the same types as an alcohol produced by hydrolysis of an alkoxysilane. Among alcohols, methanol, ethanol, and isopropanol, or the like are preferred. For example, when tetramethoxysilane is used as an alkoxysilane, a second organic solvent is preferably methanol. The above-described second organic solvent can be used solely, or two or more of the second organic solvents can be used in combination. Further, from the viewpoint of recovery and reuse of organic solvents, it is preferred that a second organic solvent contained in (B) liquid is the same as the first organic solvent contained in (A) liquid.

Contents of an alkoxysilane or its condensate and a second organic solvent in (B) liquid is not specifically limited, and can be suitably adjusted according to a desired shape, particle size, or the like. For example, when tetramethoxysilane is used as an alkoxysilane and methanol is used as a second organic solvent, an upper limit of a content of tetramethoxysilane is preferably 98% by mass or less, more preferably 95% by mass or less with respect to the whole amount of (B) liquid (100% by mass). Further, a lower limit of a content of tetramethoxysilane is preferably 50% by mass or more, more preferably 60% by mass or more with respect to the whole amount of (B) liquid (100% by mass). When a content of an alkoxysilane is 50% by mass or more and 98% by mass or less, high miscibility is achieved when mixed with (A) liquid, and a gel-like material is hard to be produced, and thus a high-concentration silica sol can be made.

[Liquid (C1) Having a pH of 5.0 or Higher and Lower than 8.0 and Containing Water]

Liquid (C1) having a pH of 5.0 or higher and lower than 8.0 and containing water in a first embodiment of the present invention contains water. In addition to water, (C1) liquid can contain other constituents so long as they do not impair the effect of the present invention and resultant liquid (C1) has a pH of 5.0 or higher and lower than 8.0.

(C1) liquid has a pH of 5.0 or higher and lower than 8.0. When the pH of (C1) liquid is lower than 8.0, local increase in concentration of a hydroxide ion in a reaction liquid can be suppressed, and thus steady reaction is made possible. Further, when the pH is 5.0 or higher, gelation of a reaction liquid can be suppressed. A pH of (C1) liquid is, from the viewpoint of suppressing gelation of a reaction liquid, preferably 5.5 or higher, more preferably 6.0 or higher. A pH of (C1) liquid measured corresponds to a value obtained by a method used for measurement in Examples.

Water contained in (C1) liquid is, from the viewpoint of reducing contamination of a metallic impurity or the like, preferably pure water or ultrapure water.

In a first embodiment of the present invention, (C1) liquid is, from the viewpoint of that it is possible to make the obtained silica particle uniform in size and to highly concentrate silica particles, preferably free of an alkaline catalyst.

[Liquid (C2) Containing Water and being Free of an Alkaline Catalyst]

(C2) liquid in a second embodiment of the present invention contains water and being free of an alkaline catalyst. Since (C2) liquid is free of an alkaline catalyst, local increase in concentration of an alkaline catalyst in a reaction liquid can be suppressed, and thus a silica particle having a uniform particle size can be obtained.

Water contained in (C2) liquid is, from the viewpoint of reducing contamination of a metallic impurity or the like, preferably pure water or ultrapure water.

[Step of Making a Reaction Liquid]

A production method of the present invention includes a step of mixing (A) liquid with (B) liquid and (C) liquid ((C) liquid refers to a comprehensive concept including at least one of (C1) liquid and (C2) liquid in the present specification) to make a reaction liquid. In the resultant reaction liquid, an alkoxysilane or its condensate is hydrolyzed and polycondensed to produce a silica sol. Thus, the silica sol can be used as it is according to applications, or as a liquid obtained after the following water substitution step or concentration step, or as an organosol dispersed in an organic solvent.

According to a method for producing a silica sol of the present invention, a silica sol having a uniform particle size of silica particles can be steadily obtained.

A method of adding (B) liquid and (C) liquid in mixing of (A) liquid with (B) liquid and (C) liquid is not specifically limited. Almost constant amount of each of (B) liquid and (C) liquid can be added to (A) liquid simultaneously, or (B) liquid and (C) liquid can be added to (A) liquid alternately. On the other hand, (B) liquid and (C) liquid can be added at random. Among the above-described methods, from the viewpoint of reducing change in amount of water used for a synthesis reaction in a reaction liquid, a method of simultaneously adding (B) liquid and (C) liquid is preferably used, and a method of simultaneously adding almost constant amount of each of (B) liquid and (C) liquid is more preferably used.

Further, a method of adding (B) liquid and (C) liquid to (A) liquid is, from the viewpoint that local increase in concentration of an alkaline catalyst in a reaction liquid can be suppressed, dividing addition or continuous addition of (B) liquid and (C) liquid to (A) liquid is preferred.

Dividing addition does not refer to simultaneously adding the total amount of (B) liquid and (C) liquid to (A) liquid when (B) liquid and (C) liquid are added to (A) liquid, but refers to non-continuously or continuously adding (B) liquid and (C) liquid divided to 2 or more portions. Specific examples of dividing addition include dropping.

Continuous addition does not refer to simultaneously adding the total amount of (B) liquid and (C) liquid when (B) liquid and (C) liquid are added to (A) liquid, but refers to continuously adding them without interruption of the addition.

Although it varies according to a liquid measure of (B) liquid or (C) liquid, time required for the addition of the total amount of (B) liquid and (C) liquid to (A) liquid can be, for example, 10 minutes or more, and the time can be suitably adjusted according to a desired particle size. Time required for the addition of the total amount of (B) liquid and (C) liquid to (A) liquid is, from the viewpoint that local increase in concentration of an alkaline catalyst in a reaction liquid is suppressed, preferably 15 minutes or more, more preferably 20 minutes or more. When (B) liquid and (C) liquid are added to (A) liquid, it is not preferred that the total amount of (B) liquid and (C) liquid is added to (A) liquid within a short time, that is, without spending time longer than a certain period of time, or that the total amount of (B) liquid and (C) liquid is added to (A) liquid at a time, from the viewpoint that unevenness of concentration of each constituent in a reaction liquid occurs. An upper limit of time required for the addition of the total amount of (B) liquid and (C) liquid to (A) liquid is not specifically limited, and the upper limit can be suitably adjusted in consideration of productivity and according to a desired particle size.

When (A) liquid is mixed with (B) liquid and (C) liquid, a preferable method of adding (B) liquid and (C) liquid is, from the viewpoint of making particle size of a silica particle uniform, a method in which the (B) liquid and the (C) liquid are each added in almost constant amount above a fixed time and the addition is completed simultaneously.

Temperatures of (A) liquid, (B) liquid, and (C) liquid in making a reaction liquid are not specifically limited. The temperatures of (A) liquid, (B) liquid, and (C) liquid in making the reaction liquid refer to a temperature of each of the liquids when (B) liquid and (C) liquid are added to (A) liquid. By regulating a temperature of the reaction liquid (each of the liquids), a particle size of a silica particle can be regulated.

A lower limit of each of the above-described liquids temperatures is preferably 0° C. or higher, more preferably 10° C. or higher. Further, the upper limits of the above-described liquids temperatures can be the same or different, and are preferably 70° C. or less, more preferably 60° C. or less, further more preferably 50° C. or less. That is, temperatures of (A) liquid, (B) liquid, and (C) liquid are preferably each independently 0 to 70° C. When the temperature is 0° C. or higher, freezing of an alkoxysilane can be prevented. On the other hand, when the temperature is 70° C. or less, volatilization of an organic solvent can be prevented.

As described above, temperatures of (A) liquid, (B) liquid, and (C) liquid can be the same or different, and a difference among temperatures of (A) liquid, (B) liquid, and (C) liquid are, from the viewpoint of making particle size of a silica particle uniform, preferably within 20° C. A difference among temperatures refers to a difference between the highest temperature and the lowest temperature of the three liquids.

In a method for producing a silica sol in an embodiment of the present invention, the above-described hydrolysis and polycondensation reactions can be carried out under any pressure condition of reduced pressure, atmospheric pressure, or elevated pressure. However, from the viewpoint of production costs, the reactions are preferably carried out under atmospheric pressure.

A molar ratio of an alkoxysilane or its condensate, water, an alkaline catalyst, and a first and a second organic solvents in the above-described reaction liquid is not specifically limited, and the molar ratio can be adjusted according to a content of an alkaline catalyst contained in (A) liquid or a content of an alkoxysilane or its condensate contained in (B) liquid.

In the present specification, "a reaction liquid" refers to a mixed liquid of (A) liquid with (B) liquid and (C) liquid, and refers to a liquid under conditions in which hydrolysis and polycondensation of an alkoxysilane or its condensate are to proceed (before proceeding). On the other hand, "a silica sol" refers to a liquid after completion of the above-described hydrolysis and polycondensation.

That is, the above-described molar ratio is a molar ratio of an alkoxysilane or its condensate, water, an alkaline catalyst, and an organic solvent (the total amounts of a first and a second organic solvents) contained in the total of (A) liquid, (B) liquid, and (C) liquid used in the reaction, in other words, contained in the total amount of a reaction liquid which is resulted from mixing the total amounts of (A) liquid, (B) liquid, and (C) liquid. Briefly, the molar ratio refers to a molar ratio in the total amounts of a reaction liquid ((A) liquid+(B) liquid+(C) liquid) which is resulted from addition of (B) liquid and (C) liquid to (A) liquid.

A molar ratio of water contained in the reaction liquid is, when a mole number of an alkoxysilane is defined as 1.0, preferably 2.0 to 12.0 moles, more preferably 3.0 to 6.0 moles. When a molar ratio of water is 2.0 moles or more, an amount of unreacted material can be reduced. When a molar ratio of water is 12.0 moles or less, concentration of silica particles in an obtained silica sol can be increased. Then, when a condensate of N-mer (N represents an integer of 2 or more) of an alkoxysilane is used, a molar ratio of water in a reaction liquid is N times as much as that resulted from using an alkoxysilane. That is, when a condensate of dimer of an alkoxysilane is used, a molar ratio of water in a reaction liquid is twice as much as that resulted from using an alkoxysilane.

A molar ratio of an alkaline catalyst contained in the reaction liquid is, when a mole number of an alkoxysilane or its condensate is defined as 1.0, preferably 0.1 to 1.0 moles. When a molar ratio of an alkaline catalyst is 0.1 or more, an amount of unreacted material can be reduced. When a molar ratio of an alkaline catalyst is 1.0 or less, steadiness of reaction can be improved.

A molar ratio of the total amounts of a first and a second organic solvents contained in the reaction liquid is, when a mole number of an alkoxysilane or its condensate is defined as 1.0, preferably 2.0 to 20.0 moles, more preferably 4.0 to 17.0 moles. When a molar ratio of the above-described organic solvent is 2.0 moles or more, an amount of unreacted material can be reduced, and when the molar ratio is 20.0 moles or less, concentration of silica particles of an obtained silica sol can be increased.

That is, it is preferred that a molar ratio of an alkoxysilane, water, an alkaline catalyst, and a first and a second organic solvents in a reaction liquid is (alkoxysilane):(water):(alkaline catalyst):(organic solvents)=(1.0):(2.0 to 12.0):(0.1 to 1.0):(2.0 to 20.0). Further, a molar ratio of a condensate of an alkoxysilane, water, an alkaline catalyst, and a first and a second organic solvents in a reaction liquid is, when a condensate of an alkoxysilane is made as N-mer (N represents an integer of 2 or more), preferably (condensate of alkoxysilane):(water):(alkaline catalyst):(organic solvents)=(1.0):(2.0×N to 12.0×N):(0.1 to 1.0):(2.0 to 20.0).

Shape of a silica particle in a silica sol is not specifically limited, and can be spherical or can be non-spherical.

Physical property values of a silica particle in a silica sol obtained by a production method of the present invention can be evaluated by, for example, an average secondary particle size, a 90% volumetric particle size ($D_{90}$), a 50% volumetric particle size ($D_{50}$), and a 10% volumetric particle size ($D_{10}$), or the like. Further, a coefficient of variation and a coefficient with respect to a particle size distribution width, which are an index of reproducibility between lots, can be calculated from these physical property values.

An average secondary particle size is a volume average particle size. For example, an assumption is made that particle sizes of silica particles are measured by dynamic light scattering method, and then the number of particles having particle sizes of d1, d2, . . . di, . . . dk is n1, n2, . . . ni . . . nk, respectively. Further, an assumption is made that volume of each one of particles is vi. In this case, the volume average particle size can be calculated by $\Sigma$ (vidi)/$\Sigma$ (vi), which is an average diameter weighted by volume.

As a 90% volumetric particle size ($D_{90}$), a 50% volumetric particle size ($D_{50}$), and a 10% volumetric particle size ($D_{10}$), for example, a value of particle size of silica particles which is finally cumulated can be used when a volume of silica particles are sequentially accumulated from a silica particle having a small particle size (obtained by a dynamic light scattering method) until reaching 90%, 50% and 10% of cumulative volume of silica particles in the silica sol obtained by a production method of a silica sol of the present invention.

A coefficient of variation can be calculated by measuring physical property values of each lot in silica particles in a silica sol which is manufactured under the same conditions, calculating a mean value and a standard deviation of the physical property values, and using the following formula.

Coefficient of variation (%)=(Standard deviation/ Mean value)×100 [Numerical formula 1]

Here, a smaller value of the above-described coefficient of variation indicates a smaller variation in particle sizes between lots.

Further, a coefficient with respect to a particle size distribution width of silica particles in a silica sol can be calculated by using the above-described $D_{90}$, $D_{50}$, and $D_{10}$ with the following formula.

Coefficient with respect to particle size distribution width=$(D_{90}-D_{10})/D_{50}$ [Numerical formula 2]

Here, a smaller coefficient with respect to the above-described particle size distribution width indicates a sharp particle size distribution. On the other hand, a larger coefficient with respect to the particle size distribution width indicates a broad particle size distribution.

Furthermore, according to the coefficient with respect to the particle size distribution width, relative comparison and evaluation of the particle size distribution width can be made whether the particle size is large or small. Further, by calculating a coefficient of variation in coefficients with respect to the particle size distribution widths, reproducibility of particle size distributions between lots can be evaluated.

As described above, according to a production method of the present invention, a silica sol having a uniform particle size (an average secondary particle size) of silica particles can be steadily obtained in any particle size of silica particles. Further, according to a production method of the present invention, a silica sol showing similar particle size distribution width can be produced regardless of a particle size (an average secondary particle size) of the silica particles. The particle size distribution width of silica particles in a silica sol can be adjusted, for example, by adjusting duration of time required for addition of the total amount of (B) liquid and (C) liquid to (A) liquid, a component concentration of each liquid, a molar ratio of the liquids, or the like.

As an average secondary particle size of silica particles, a desired particle size can be selected, and the average secondary particle size of silica particles is preferably 5.0 to 1000.0 nm. A value of an average secondary particle size of silica particles can be measured as a volume average particle size by, for example, dynamic light scattering method. According to a production method of the present invention, a silica particle having a small variation in particle sizes can be steadily produced in any particle size of silica particles.

A concentration of silica particles in a silica sol manufactured by a production method of the present invention varies according to a particle size of an obtained silica particle, and for example, when an average secondary particle size is 50 to 350 nm, the concentration is preferably 5% by mass or more and 25% by mass or less, more preferably 7% by mass or more and 20% by mass or less.

A pH of a silica sol manufactured by a production method of the present invention is preferably 7.0 to 13.0, more preferably 8.0 to 12.0. A pH of a silica sol measured corresponds to a value obtained by a method used for measurement in Examples.

According to a production method of the present invention, a total content of metallic impurities such as Al, Ca, B, Ba, Co, Cr, Cu, Fe, Mg, Mn, Na, Ni, Pb, Sr, Ti, Zn, Zr, U, Th, or the like can be 1 ppm or less.

<Post-Processing Step>

In a method for producing a silica sol of the present invention, in addition to the above-described step of making a reaction liquid, a post-processing step described below can be carried out.

Specifically, at least one of the steps of a water substitution step of substituting an organic solvent present in the silica sol with water and a concentration step of concentrating the silica sol can be performed. More specifically, a concentration step of concentrating the silica sol can be carried out solely; a water substitution step of substituting an organic solvent present in the silica sol with water can be carried out solely; after the concentration step, a water substitution step of substituting an organic solvent in the concentrated liquid with water can be carried out; or, after the water substitution step is carried out, a concentration step of concentrating the water-substituted liquid can be carried out. Further, multiple concentration steps can be carried out, wherein a water substitution step can be carried out between a concentration step and another concentration step; for example, after a concentration step, a water substitution step of substituting an organic solvent in a concentrated liquid with water is carried out, and then another concentration step of concentrating the water-substituted liquid can be further carried out.

[Water Substitution Step]

A method for producing a silica sol of the present invention can include, as one embodiment of the present invention, a step of substituting an organic solvent contained in the silica sol with water (also simply referred to as "a water substitution step" in the present specification). A silica sol of this embodiment includes a configuration in which a silica sol is subjected to a concentration step (a concentrated silica sol).

When ammonia is selected as an alkaline catalyst, by substituting an organic solvent in the silica sol with water, a pH of the silica sol can be adjusted to a neutral region, and a water-substituted silica sol stable for a long period can be obtained by removing unreacted materials contained in the silica sol.

As a method of substituting an organic solvent in the silica sol with water, a conventionally known method can be used, and examples of the method include a method of substitution by using heat distillation with dropping water while keeping a liquid measure of the silica sol at a certain level or more. In this case, the substitution operation is preferably continued until liquid temperature and overhead temperature reach a boiling point of water for substitution.

As water used in this step, from the viewpoint of reducing contamination of a metallic impurity or the like, pure water or ultrapure water is preferably used.

Further, a method of substituting an organic solvent in a silica sol with water also includes a method of separating a silica particle by centrifugal separation followed by redispersing the resultant in water.

[Concentration Step]

A method for producing a silica sol of the present invention can further include, as one embodiment of the present invention, a step for concentrating the silica sol (also simply referred to as "a concentration step" in the present specification). A silica sol of this embodiment includes a configuration in which a silica sol is subjected to a water substitution step (a water-substituted a silica sol).

A method of concentrating a silica sol is not specifically limited, and a conventionally known method can be used, and examples of the method include a heat concentration method, a membrane concentration method, or the like.

In a heat concentration method, a silica sol can be heat concentrated under atmospheric pressure or under reduced pressure to obtain a concentrated silica sol.

In a membrane concentration method, a silica sol can, for example, be concentrated through membrane separation by ultrafiltration in which a silica particle can be filtered. A molecular weight cut-off of an ultrafiltration membrane is not specifically limited, and can be selected according to a particle size of produced particles. A material constituting an ultrafiltration membrane is not specifically limited, and examples of the material include polysulfone, polyacrylonitrile, a sintered metal, a ceramic, carbon, or the like. A configuration of an ultrafiltration membrane is not specifically limited, and includes spiral type, tubular type, hollow fiber type, or the like. In an ultrafiltration method, operation pressure is not specifically limited, and can be set at a pressure not exceeding a working pressure of an ultrafiltration membrane used.

EXAMPLE

The present invention is described in more detail using following Examples and Comparative Examples. However, the technical scope of the present invention is not limited to the following Examples. Unless otherwise indicated, "%" and "parts" refer to "% by mass" and "parts by mass", respectively. In the following Examples, unless otherwise indicated, operations were carried out under conditions of at room temperature (25° C.) and relative humidity of 40 to 50% RH.

Example 1

Example 1-1; Preparation of Silica Sol

Into (A) liquid where 208.9 g of pure water and 23.4 g of ammonia were mixed with 1223.0 g of methanol, (B) liquid in which 1014.8 g of tetramethoxysilane (TMOS) was dissolved in 76.4 g of methanol and (C) liquid which was 211.7 g of pure water were dropped for 150 minutes while holding a temperature of each liquid at 35° C. to make a reaction liquid, and thus a silica sol was obtained.

A molar ratio of TMOS, pure water, ammonia, and methanol in the reaction liquid was TMOS:pure water: ammonia:methanol=1.0:3.5:0.2:6.1.

The pH values of (C) liquid and the obtained silica sols were measured using a pH meter F-72 manufactured by HORIBA, Ltd. The pH of (C) liquid was 7.85, and the pH of the obtained silica sol was 10.67.

Examples 1-2 to 1-5; Preparation of Silica Sol

Different lots of silica sols (Examples 1-2 to 1-5) than Example 1-1 were obtained by operations similar to those of Example 1-1.

The pH values of (C) liquid and the obtained silica sol were measured as described above. The pH of (C) liquid was 7.85. Further, the pH values of silica sols obtained in Examples 1-2 to 1-5 are shown in Table 1.

Example 2

Example 2-1; Preparation of Silica Sol

A silica sol was obtained by operations similar to those of Example 1-1 except that a temperature of each liquid was held at 22° C.

The pH values of (C) liquid and the obtained silica sol were measured as described above. The pH of (C) liquid was 7.85, and the pH of the obtained silica sol was 10.55.

Examples 2-2 to 2-5; Preparation of Silica Sol

Different lots of silica sols (Examples 2-2 to 2-5) than Example 2-1 were obtained by operations similar to those of Example 2-1.

The pH values of (C) liquid and the obtained silica sols were measured as described above. The pH of (C) liquid was 7.85. Further, the pH values of silica sols obtained in Examples 2-2 to 2-5 are shown in Table 1.

Example 3

Example 3-1; Preparation of Silica Sol

A silica sol was obtained by operations similar to those of Example 1-1 except that a temperature of each liquid was held at 47° C.

The pH values of (C) liquid and the obtained silica sol were measured as described above. The pH of (C) liquid was 7.85, and the pH of the obtained silica sol was 10.84.

Examples 3-2 to 3-5; Preparation of Silica Sol

Different lots of silica sols (Examples 3-2 to 3-5) than Example 3-1 were obtained by operations similar to those of Example 3-1.

The pH values of (C) liquid and the obtained silica sols were measured as described above. The pH of (C) liquid was 7.85. Further, the pH values of silica sols obtained in Examples 3-2 to 3-5 are shown in Table 1.

Example 4

Example 4-1; Preparation of Silica Sol

Into (A) liquid where 237.5 g of pure water and 35.1 g of ammonia were mixed with 1223.0 g of methanol, (B) liquid in which 1014.8 g of tetramethoxysilane (TMOS) was dissolved in 76.4 g of methanol and (C) liquid which was 211.7 g of pure water were dropped for 150 minutes while holding a temperature of each liquid at 22° C. to make a reaction liquid, and thus a silica sol was obtained.

A molar ratio of TMOS, pure water, ammonia, and methanol in the reaction liquid was TMOS:pure water: ammonia:methanol=1.0:3.7:0.3:6.1.

The pH values of (C) liquid and the obtained silica sol were measured as described above. The pH of (C) liquid was 7.85, and the pH of the obtained silica sol was 10.96.

Examples 4-2 to 4-5; Preparation of Silica Sol

Different lots of silica sols (Examples 4-2 to 4-5) than Example 4-1 were obtained by operations similar to those of Example 4-1.

The pH values of (C) liquid and the obtained silica sols were measured as described above. The pH of (C) liquid was 7.85. Further, the pH values of silica sols obtained in Examples 4-2 to 4-5 are shown in Table 1.

Comparative Example 1

Comparative Example 1-1; Preparation of Silica Sol

Into (A) liquid where 180.2 g of pure water and 11.7 g of ammonia were mixed with 1223.0 g of methanol, (B) liquid in which 1014.8 g of tetramethoxysilane (TMOS) was dissolved in 76.4 g of methanol and (C') liquid in which 11.7 g of ammonia was mixed with 240.3 g of pure water were dropped for 150 minutes while holding a temperature of each liquid at 35° C. to make a reaction liquid, and thus a silica sol was obtained.

A molar ratio of TMOS, pure water, ammonia, and methanol in the reaction liquid was TMOS:pure water:ammonia:methanol=1.0:3.5:0.2:6.1.

The pH values of (C') liquid and the obtained silica sol were measured as described above. The pH of (C') liquid was 12.05, and the pH of the obtained silica sol was 10.61.

Comparative Examples 1-2 to 1-5; Preparation of Silica Sol

Different lots of silica sols (Comparative Examples 1-2 to 1-5) than Comparative Example 1-1 were obtained by operations similar to those of Comparative Example 1-1.

The pH values of (C') liquid and the obtained silica sols were measured as described above. The pH of (C') liquid was 12.05. Further, the pH values of silica sols obtained in Comparative Examples 1-2 to 1-5 are shown in Table 2.

Comparative Example 2

Comparative Example 2-1; Preparation of Silica Sol

A silica sol was obtained by operations similar to those of Comparative Example 1-1 except that a temperature of each liquid was held at 25° C.

The pH values of (C') liquid and the obtained silica sol were measured as described above. The pH of (C') liquid was 12.05, and the pH of the obtained silica sol was 10.61.

Comparative Examples 2-2 to 2-5; Preparation of Silica Sol

Different lots of silica sols (Comparative Examples 2-2 to 2-5) than Comparative Example 2-1 were obtained by operations similar to those of Comparative Example 2-1.

The pH values of (C') liquid and the obtained silica sols were measured as described above. The pH of (C') liquid was 12.05. Further, the pH values of silica sols obtained in Comparative Examples 2-2 to 2-5 are shown in Table 2.

Comparative Example 3

Comparative Example 3-1; Preparation of Silica Sol

A silica sol was obtained by operations similar to those of Comparative Example 1-1 except that a temperature of each liquid was held at 10° C.

The pH values of (C') liquid and the obtained silica sol were measured as described above. The pH of (C') liquid was 12.05, and the pH of the obtained silica sol was 10.44.

Comparative Examples 3-2 to 3-5; Preparation of Silica Sol

Different lots of silica sols (Comparative Examples 3-2 to 3-5) than Comparative Example 3-1 were obtained by operations similar to those of Comparative Example 3-1.

The pH values of (C') liquid and the obtained silica sols were measured as described above. The pH of (C') liquid was 12.05. Further, the pH values of silica sols obtained in Comparative Examples 3-2 to 3-5 are shown in Table 2.

Comparative Example 4

Comparative Example 4-1; Preparation of Silica Sol

Into (A) liquid where 180.2 g of pure water and 11.7 g of ammonia were mixed with 1223.0 g of methanol, (B) liquid in which 1014.8 g of tetramethoxysilane (TMOS) was dissolved in 76.4 g of methanol and (C') liquid in which 23.4 g of ammonia was mixed with 268.9 g of pure water were dropped for 150 minutes while holding a temperature of each liquid at 10° C. to make a reaction liquid, and thus a silica sol was obtained.

A molar ratio of TMOS, pure water, ammonia, and methanol in the reaction liquid was TMOS:pure water:ammonia:methanol=1.0:3.7:0.3:6.1.

The pH values of (C') liquid and the obtained silica sol were measured as described above. The pH of (C') liquid was 12.24, and the pH of the obtained silica sol was 11.02.

Comparative Example 4-2; Preparation of Silica Sol

A different lot of a silica sol (Comparative Example 4-2) than Comparative Example 4-1 was obtained by operations similar to those of Comparative Example 4-1.

The pH values of (C') liquid and the obtained silica sol were measured as described above. The pH of (C') liquid was 12.24, and the pH of the obtained silica sol was 11.03.

Comparative Example 5

Comparative Example 5-1; Preparation of Silica Sol

A silica sol was obtained by operations similar to those of Comparative Example 4-1 except that a temperature of each liquid was held at 22° C.

The pH values of (C') liquid and the obtained silica sol were measured as described above. The pH of (C') liquid was 12.24, and the pH of the obtained silica sol was 11.02.

Comparative Examples 5-2; Preparation of Silica Sol

A different lot of a silica sol (Comparative Examples 5-2) than Comparative Examples 5-1 was obtained by operations similar to those of Comparative Examples 5-1.

The pH values of (C') liquid and the obtained silica sol were measured as described above. The pH of (C') liquid was 12.24, and the pH of the obtained silica sol was 11.01.

In Tables 1 and 2, a reaction temperature indicates a temperature of each of (A) to (C) liquids.

In Tables 1 and 2, "-" indicates that the value was not calculated.

[Measurement of Physical Property Values]

With respect to silica particles in silica sols of Examples and Comparative Examples, the following physical property values were measured.

(Average Secondary Particle Size)

An average secondary particle size was measured as a volume average particle size by dynamic light scattering method using a particle size distribution measurement apparatus (UPA-UT151, manufactured by NIKKISO CO., LTD.).

(90% Volumetric Particle Size ($D_{90}$ Value))

A 90% volumetric particle size ($D_{90}$ value) was a value of particle size of silica particles which was finally cumulated when a volume of silica particles were sequentially accumulated from a silica particle having a small particle size (obtained by a dynamic light scattering method) until reaching 90% of cumulative volume of silica particles in the silica sol obtained.

(50% Volumetric Particle Size ($D_{50}$ Value))

A 50% volumetric particle size ($D_{50}$ value) was a value of particle size of silica particles which was finally cumulated when a volume of silica particles were sequentially accumulated from a silica particle having a small particle size (obtained by a dynamic light scattering method) until reaching 50% of cumulative volume of silica particles in the silica sol obtained.

(10% Volumetric Particle Size ($D_{10}$ Value))

A 10% volumetric particle size ($D_{90}$ value) was a value of particle size of silica particles which was finally cumulated when a volume of silica particles are sequentially accumulated from a silica particle having a small particle size (obtained by a dynamic light scattering method) until reaching 10% of cumulative volume of silica particles in the silica sol obtained.

(Coefficient of Variation)

In Examples 1 to 4 and Comparative Examples 1 to 5, a mean value and a standard deviation were calculated from the above-measured physical property values, and a coefficient of variation was calculated using the following formula.

Coefficient of variation (%)=(Standard deviation/Mean value)×100 [Numerical formula 3]

(Coefficient with Respect to Particle Size Distribution Width)

In Examples 1 to 4 and Comparative Examples 1 to 5, using the above-measured $D_{90}$, $D_{50}$, and $D_{10}$, a coefficient with respect to a particle size distribution width of a silica particle in a silica sol was calculated by the following formula.

Coefficient with respect to particle size distribution width=$(D_{90}-D_{10})/D_{50}$ [Numerical formula 4]

(Silica Concentration)

A silica concentration was determined by, without carrying out a post-processing step such as concentration or water substitution, mixing (A) liquid with (B) liquid and (C) liquid or (C') liquid to make a reaction liquid, and measuring a concentration of silica particles in the obtained silica sol. Specifically, the silica concentration was determined as a value obtained by evaporating a silica sol to dryness, and carrying out a calculation using an amount of the resultant residue.

Results of the above-described measurement of physical property values are described in Table 1 and Table 2. Further, with respect to silica particles in silica sols of Examples 1 to 4 and Comparative Examples 1 to 5, relationships between a coefficient of variation in average secondary particle sizes and a mean value of average secondary particle sizes in each of lots are shown in FIG. 1, and relationships between a mean value of coefficients with respect to particle size distribution widths and a mean value of average secondary particle sizes in each of lots are shown in FIG. 2.

TABLE 1

| | Average secondary particle size [nm] | $D_{10}$ [nm] | $D_{50}$ [nm] | $D_{90}$ [nm] | $D_{90} - D_{10}$ [nm] | $(D_{90} - D_{10})/D_{50}$ | Silica concentration [% by mass] | pH of silica sol | pH of (C) liquid | Reaction temperature (° C.) |
|---|---|---|---|---|---|---|---|---|---|---|
| Example 1 | | | | | | | | | | |
| Example 1-1 | 77.0 | 54.9 | 74.1 | 101.8 | 46.9 | 0.63 | 15.9 | 10.67 | 7.85 | 35 |
| Example 1-2 | 76.7 | 56.6 | 75.0 | 98.9 | 42.3 | 0.56 | 15.7 | 10.73 | | |
| Example 1-3 | 80.2 | 57.1 | 77.4 | 106.1 | 49.0 | 0.63 | 15.6 | 10.79 | | |
| Example 1-4 | 77.3 | 55.7 | 75.3 | 100.9 | 45.2 | 0.60 | 15.9 | 10.67 | | |
| Example 1-5 | 76.0 | 54.8 | 73.5 | 100.0 | 45.2 | 0.61 | 15.7 | 10.73 | | |
| Mean value | 77.44 | 55.82 | 75.06 | 101.54 | 45.72 | 0.61 | 15.76 | 10.72 | — | — |
| Standard deviation | 1.62 | 1.02 | 1.49 | 2.77 | 2.47 | 0.03 | — | — | — | — |
| Coefficient of variation | 2.09% | 1.82% | 1.99% | 2.72% | 5.40% | 4.71% | — | — | — | — |
| Example 2 | | | | | | | | | | |
| Example 2-1 | 156.0 | 119.7 | 151.8 | 197.2 | 77.5 | 0.51 | 15.8 | 10.55 | 7.85 | 22 |
| Example 2-2 | 149.6 | 110.9 | 146.3 | 192.3 | 81.4 | 0.56 | 15.9 | 10.60 | | |
| Example 2-3 | 151.4 | 116.8 | 146.1 | 192.0 | 75.2 | 0.51 | 15.8 | 10.55 | | |
| Example 2-4 | 152.3 | 116.9 | 150.2 | 191.0 | 74.1 | 0.49 | 15.9 | 10.60 | | |
| Example 2-5 | 146.9 | 111.2 | 143.0 | 186.9 | 75.7 | 0.53 | 15.9 | 10.55 | | |
| Mean value | 151.24 | 115.10 | 147.48 | 191.88 | 76.78 | 0.52 | 15.86 | 10.57 | — | — |
| Standard deviation | 3.37 | 3.88 | 3.52 | 3.68 | 2.86 | 0.02 | — | — | — | — |
| Coefficient of variation | 2.23% | 3.37% | 2.38% | 1.92% | 3.72% | 4.54% | — | — | — | — |
| Example 3 | | | | | | | | | | |
| Example 3-1 | 40.1 | 29.0 | 38.3 | 53.3 | 24.3 | 0.63 | 15.6 | 10.84 | 7.85 | 47 |
| Example 3-2 | 38.2 | 28.6 | 37.3 | 48.8 | 20.2 | 0.54 | 15.8 | 10.79 | | |
| Example 3-3 | 39.3 | 29.5 | 38.3 | 50.5 | 21.0 | 0.55 | 15.9 | 10.75 | | |
| Example 3-4 | 39.2 | 29.4 | 38.2 | 50.2 | 20.8 | 0.55 | 15.9 | 10.75 | | |
| Example 3-5 | 38.4 | 29.3 | 37.6 | 48.7 | 19.4 | 0.52 | 15.8 | 10.79 | | |
| Mean value | 39.04 | 29.16 | 37.94 | 50.30 | 21.14 | 0.56 | 15.80 | 10.78 | — | — |
| Standard deviation | 0.76 | 0.36 | 0.46 | 1.86 | 1.87 | 0.05 | — | — | — | — |

TABLE 1-continued

| | Average secondary particle size [nm] | $D_{10}$ [nm] | $D_{50}$ [nm] | $D_{90}$ [nm] | $D_{90} - D_{10}$ [nm] | $(D_{90} - D_{10})/D_{50}$ | Silica concentration [% by mass] | pH of silica sol | pH of (C) liquid | Reaction temperature (° C.) |
|---|---|---|---|---|---|---|---|---|---|---|
| Coefficient of variation | 1.96% | 1.25% | 1.22% | 3.70% | 8.86% | 8.10% | — | — | — | — |
| Example 4 | | | | | | | | | | |
| Example 4-1 | 310.4 | 224.1 | 306.1 | 400.6 | 176.5 | 0.58 | 15.3 | 10.96 | 7.85 | 22 |
| Example 4-2 | 329.3 | 235.5 | 321.8 | 426.1 | 190.6 | 0.59 | 15.8 | 10.94 | | |
| Example 4-3 | 308.1 | 222.9 | 299.1 | 405.4 | 182.5 | 0.61 | 15.7 | 10.85 | | |
| Example 4-4 | 312.8 | 230.6 | 307.8 | 400.0 | 169.4 | 0.55 | 15.7 | 10.85 | | |
| Example 4-5 | 306.9 | 224.8 | 302.2 | 393.4 | 168.6 | 0.56 | 15.3 | 10.94 | | |
| Mean value | 313.50 | 227.58 | 307.40 | 405.10 | 177.52 | 0.58 | 15.56 | 10.91 | — | — |
| Standard deviation | 9.12 | 5.33 | 8.73 | 12.49 | 9.25 | 0.02 | — | — | — | — |
| Coefficient of variation | 2.91% | 2.34% | 2.84% | 3.08% | 5.21% | 4.25% | — | — | — | — |

TABLE 2

| | Average secondary particle size [nm] | $D_{10}$ [nm] | $D_{50}$ [nm] | $D_{90}$ [nm] | $D_{90} - D_{10}$ [nm] | $(D_{90} - D_{10})/D_{50}$ | Silica concentration [% by mass] | pH of silica sol | pH of (C') liquid | Reaction temperature (° C.) |
|---|---|---|---|---|---|---|---|---|---|---|
| Comparative Example 1 | | | | | | | | | | |
| Comparative Example 1-1 | 31.8 | 22.6 | 30.7 | 42.3 | 19.7 | 0.64 | 15.6 | 10.61 | 12.05 | 35 |
| Comparative Example 1-2 | 32.0 | 22.1 | 30.8 | 43.2 | 21.1 | 0.69 | 15.8 | 10.21 | | |
| Comparative Example 1-3 | 32.4 | 23.1 | 31.1 | 43.1 | 20.0 | 0.64 | 15.8 | 10.21 | | |
| Comparative Example 1-4 | 30.7 | 21.4 | 29.4 | 41.2 | 19.8 | 0.67 | 15.6 | 10.61 | | |
| Comparative Example 1-5 | 31.1 | 20.9 | 29.6 | 43.0 | 22.1 | 0.75 | 15.6 | 10.67 | | |
| Mean value | 31.60 | 22.02 | 30.32 | 42.56 | 20.54 | 0.68 | 15.68 | 10.46 | — | — |
| Standard deviation | 0.69 | 0.89 | 0.77 | 0.84 | 1.04 | 0.04 | — | — | — | — |
| Coefficient of variation | 2.18% | 4.03% | 2.53% | 1.97% | 5.04% | 6.31% | — | — | — | — |
| Comparative Example 2 | | | | | | | | | | |
| Comparative Example 2-1 | 49.1 | 33.4 | 46.9 | 67.3 | 33.9 | 0.72 | 15.7 | 10.61 | 12.05 | 25 |
| Comparative Example 2-2 | 48.4 | 31.8 | 46.2 | 75.4 | 43.6 | 0.94 | 15.7 | 10.61 | | |
| Comparative Example 2-3 | 50.3 | 33.5 | 47.8 | 69.7 | 36.2 | 0.76 | 15.6 | 10.74 | | |
| Comparative Example 2-4 | 46.8 | 29.1 | 44.1 | 68.3 | 39.2 | 0.89 | 15.7 | 10.61 | | |
| Comparative Example 2-5 | 50.2 | 34.0 | 48.5 | 68.0 | 34.0 | 0.70 | 15.6 | 10.74 | | |
| Mean value | 48.96 | 32.36 | 46.70 | 69.74 | 37.38 | 0.80 | 15.66 | 10.66 | — | — |
| Standard deviation | 1.44 | 2.00 | 1.70 | 3.28 | 4.09 | 0.11 | — | — | — | — |
| Coefficient of variation | 2.95% | 6.18% | 3.63% | 4.71% | 10.94% | 13.37% | — | — | — | — |
| Comparative Example 3 | | | | | | | | | | |
| Comparative Example 3-1 | 114.7 | 65.3 | 103.2 | 174.1 | 108.8 | 1.05 | 15.8 | 10.44 | 12.05 | 10 |
| Comparative Example 3-2 | 138.6 | 90.1 | 132.6 | 193.5 | 103.4 | 0.78 | 15.8 | 10.61 | | |
| Comparative Example 3-3 | 143.9 | 103.9 | 137.2 | 189.1 | 85.2 | 0.62 | 15.8 | 10.61 | | |
| Comparative Example 3-4 | 110.3 | 59.5 | 95.8 | 178.1 | 118.6 | 1.24 | 15.8 | 10.44 | | |
| Comparative Example 3-5 | 138.7 | 84.8 | 132.8 | 199.6 | 114.8 | 0.86 | 15.6 | 10.65 | | |

TABLE 2-continued

| | Average secondary particle size [nm] | $D_{10}$ [nm] | $D_{50}$ [nm] | $D_{90}$ [nm] | $D_{90} - D_{10}$ [nm] | $(D_{90} - D_{10})/D_{50}$ | Silica concentration [% by mass] | pH of silica sol | pH of (C') liquid | Reaction temperature (° C.) |
|---|---|---|---|---|---|---|---|---|---|---|
| Mean value | 129.24 | 80.72 | 120.32 | 186.88 | 106.16 | 0.91 | 15.76 | 10.55 | — | — |
| Standard deviation | 15.51 | 18.23 | 19.27 | 10.62 | 13.07 | 0.24 | — | — | — | — |
| Coefficient of variation | 12.00% | 22.59% | 16.02% | 5.68% | 12.31% | 26.36% | — | — | — | — |
| Comparative Example 4 | | | | | | | | | | |
| Comparative Example 4-1 | 177.8 | 111.9 | 152.6 | 289.3 | 177.4 | 1.16 | 15.3 | 11.02 | 12.24 | 35 |
| Comparative Example 4-2 | 154.8 | 94.4 | 146.4 | 221.0 | 126.6 | 0.86 | 15.6 | 11.03 | | |
| Mean value | 166.30 | 103.15 | 149.50 | 255.15 | 152.00 | 1.01 | 15.45 | 11.03 | — | — |
| Standard deviation | 16.26 | 12.37 | 4.38 | 48.30 | 35.92 | 0.21 | — | — | — | — |
| Coefficient of variation | 9.78% | 12.00% | 2.93% | 18.93% | 23.63% | 20.77% | — | — | — | — |
| Comparative Example 5 | | | | | | | | | | |
| Comparative Example 5-1 | 93.6 | 62.1 | 86.8 | 129.5 | 67.4 | 0.78 | 15.4 | 11.02 | 12.24 | 22 |
| Comparative Example 5-2 | 82.9 | 48.1 | 76.4 | 126.9 | 78.8 | 1.03 | 15.4 | 11.01 | | |
| Mean value | 88.25 | 55.10 | 81.60 | 128.20 | 73.10 | 0.90 | 15.40 | 11.02 | — | — |
| Standard deviation | 7.57 | 9.90 | 7.35 | 1.84 | 8.06 | 0.18 | — | — | — | — |
| Coefficient of variation | 8.57% | 17.97% | 9.01% | 1.43% | 11.03% | 19.94% | — | — | — | — |

As shown in Table 1, in Examples 1 to 4, a coefficient of variation in physical property values of a silica particle in the produced silica sols is small, that is, a difference between lots is small. Specifically, when an average secondary particle size becomes larger, a coefficient of variation is a small value, i.e. 3% or less (see, FIG. 1). Thus, in a production method of Examples, it is understood that a silica sol having a uniform particle size can be steadily produced in any particle size of silica particles.

On the other hand, as shown in Table 2, in Comparative Examples 1 to 5, when a particle size of silica particles becomes larger, coefficients of variations in physical property values of silica particles in the produced silica sols become larger, that is, a difference between lots is large (see FIG. 1). Thus, in a production method of Comparative Examples, it is understood that a silica sol having a uniform particle size cannot be steadily produced in any particle size of silica particles.

Further, as shown in Table 1, in Examples 1 to 4, coefficients with respect to particle size distribution widths can be equivalent to each other regardless of average secondary particle sizes of silica particles, and further a particle size distribution can be sharper as compared to in Comparative Examples (see FIG. 2). Thus, in production methods of Examples, it is understood that when a particle size of silica particles in a silica sol is changed, a particle size distribution width of silica particles can be regulated.

On the other hand, as shown in Table 2, in Comparative Examples 1 to 5, coefficients with respect to particle size distribution widths are not equivalent, and when an average secondary particle size of silica particles becomes larger, a particle size distribution becomes broader (see FIG. 2). Thus, in production methods of Comparative Examples, it is understood that when particle sizes of silica particle differ, a particle size distribution width of silica particles is difficult to regulate.

Accordingly, it is understood that when comparing between Examples and Comparative Examples, in Examples, within a broader range of particle sizes of silica particles as compared to Comparative Examples, a coefficient of variation is small and a particle size distribution width is restricted.

That is, in Examples, since (C) liquid is a liquid having a pH of 5.0 or higher and lower than 8.0 and containing water or a liquid containing water and being free of an alkaline catalyst, when (A) liquid is mixed with (B) liquid and (C) liquid, a variation of ammonia (an alkaline catalyst) concentration in the mixed liquid is suppressed, and thus homogeneous combined particles are produced. It is thought that, since a reaction is consequently stabilized, in any average secondary particle size of silica particles, a similar particle size distribution width can be obtained, and reproducibility is stabilized.

On the other hand, it is thought that, in Comparative Examples, since (C') liquid contains water and ammonia (an alkaline catalyst), when (A) liquid is mixed with (B) liquid and (C') liquid, variation in ammonia (an alkaline catalyst) concentration in the liquid mixture locally occurs (concentration increases locally). Thus, it is thought that, the reaction is not stabilized and heterogeneous combined particles are produced, which leads to wide variation in a particle size of silica particles. Consequently, it is thought that, when an average secondary particle size of silica particles is changed, a similar particle size distribution width cannot be obtained, and then reproducibility is not stabilized.

Further, as shown in Tables 1 and 2, it is understood that when comparing Examples 1 to 3 and Comparative Examples 1 to 5, a decrease in reaction temperature can lead to a larger average secondary particle size of silica particles, and an increase in reaction temperature can lead to a smaller average secondary particle size of silica particles.

In addition, it is understood that when comparing Examples 2 and 4, and Comparative Examples 2 to 5, an increase in ammonia concentration can lead to a larger average secondary particle size of silica particles.

Moreover, in a production method of the invention of the present application, it is understood from Example 4 that a silica particle having a large average secondary particle size (e.g., 200 nm or more) can be synthesized. On the other hand, it is thought from the results of Comparative Examples 4 and 5 that, in a production method of Comparative Examples, even if a reaction temperature is decreased, or an ammonia concentration is increased, a silica particle having a large particle size cannot be synthesized.

The present application is based on Japanese Patent Application No. 2015-152705 filed on Jul. 31, 2015, and the contents disclosed are incorporated by reference in its entirety.

The invention claimed is:

1. A method for producing a silica sol, comprising a step of mixing
   - liquid (A) containing an alkaline catalyst, water and a first organic solvent with
   - liquid (B) containing an alkoxysilane or its condensate and a second organic solvent, and
   - liquid (C) containing water to make a reaction liquid, provided that the liquid (B) contains the alkoxysilane, a molar ratio of the alkoxysilane and the water in the reaction liquid is (alkoxysilane):(water)=(1.0):(2.0 to 12.0), and provided that the liquid (B) contains the condensate of the alkoxysilane, a molar ratio of the condensate of the alkoxysilane and the water in the reaction liquid is, when the condensate is N-mer of the alkoxysilane (N represents an integer of 2 or more), (condensate of alkoxysilane):(water)=(1.0):(2.0×N to 12.0×N).

2. The method for producing a silica sol according to claim 1, wherein temperatures of the liquid (A), the liquid (B), and the liquid (C) are each independently 0 to 70° C.

3. The method for producing a silica sol according to claim 1, wherein the alkoxysilane is tetramethoxysilane.

4. The method for producing a silica sol according to claim 1, wherein the alkaline catalyst is at least one of ammonia and an ammonium salt.

5. The method for producing a silica sol according to claim 4, wherein the alkaline catalyst is ammonia.

6. The method for producing a silica sol according to claim 1, wherein the first and second organic solvents are methanol.

* * * * *